United States Patent
Cheong et al.

(10) Patent No.: US 8,439,545 B2
(45) Date of Patent: May 14, 2013

(54) BACKLIGHT ASSEMBLY AND DISPLAY APPARATUS HAVING THE SAME

(75) Inventors: Byoungho Cheong, Yongin-si (KR);
Guk Hyun Kim, Yongin-si (KR);
Prudnikov Oleg, Suwon-si (KR)

(73) Assignee: Samsung Display Co., Ltd. (KR)

( * ) Notice: Subject to any disclaimer, the term of this patent is extended or adjusted under 35 U.S.C. 154(b) by 347 days.

(21) Appl. No.: 12/856,965

(22) Filed: Aug. 16, 2010

(65) Prior Publication Data

US 2011/0249214 A1 Oct. 13, 2011

(30) Foreign Application Priority Data

Apr. 13, 2010 (KR) .................. 10-2010-0033882

(51) Int. Cl.
*F21V 7/04* (2006.01)
(52) U.S. Cl.
USPC ......... 362/561; 362/97.2; 362/97.3; 362/257; 362/559
(58) Field of Classification Search ........ 362/97.1–97.4, 362/257, 293, 311.01, 606, 615, 621, 559, 362/561; 349/61
See application file for complete search history.

(56) References Cited

U.S. PATENT DOCUMENTS

2009/0180282 A1* 7/2009 Aylward et al. ............ 362/245

FOREIGN PATENT DOCUMENTS

| KR | 1020060039633 | 5/2006 |
|---|---|---|
| KR | 1020060111266 | 10/2006 |
| KR | 1020070012085 | 1/2007 |
| KR | 1020070021843 | 2/2007 |
| KR | 100869573 | 11/2008 |

* cited by examiner

*Primary Examiner* — Stephen F Husar
(74) *Attorney, Agent, or Firm* — Cantor Colburn LLP

(57) ABSTRACT

A backlight assembly includes; a light source including a light emitting surface through which a light exits and an optical member including a first surface disposed adjacent to the light source and a second surface disposed substantially opposite to the first surface, wherein the optical member covers the light source and guides the light therethrough, wherein the optical member includes; an incident surface to which the light is incident, the incident surface being connected with the first surface corresponding to the light source, an optical pattern disposed on the second surface and corresponding to the light source, the optical pattern reflecting a first light of the light incident through the incident surface through total internal reflection and a light guide pattern disposed on the first surface, wherein the light guide pattern directs the reflected first light to an exterior of the optical member.

18 Claims, 8 Drawing Sheets

BACKLIGHT ASSEMBLY AND DISPLAY APPARATUS HAVING THE SAME

This application claims priority to Korean Patent Application No. 2010-33882, filed on Apr. 13, 2010, and all the benefits accruing therefrom under 35 U.S.C. §119, the content of which in its entirety is herein incorporated by reference.

BACKGROUND OF THE INVENTION

1. Field of the Invention

The present invention relates to a backlight assembly capable of reducing volume and manufacturing cost and a display apparatus having the backlight assembly.

2. Description of the Related Art

In general, a display apparatus includes a backlight assembly that generates a light and a display panel that displays an image using the light. This is especially true of liquid crystal display ("LCD") devices where the liquid crystal panel is not self-emissive.

A backlight assembly employing a light emitting diode as its light source has recently been developed. The light emitting diode generally has superior light emitting efficiency to alternative forms of illumination, e.g., cold cathode fluorescent lamps ("CCFL"), etc., thereby reducing the electrical power required to drive a display apparatus. However, since the price of the light emitting diode is relatively expensive compared to a CCFL, the manufacturing cost of the backlight assembly increases when the backlight assembly employs the light emitting diode as its light source.

BRIEF SUMMARY OF THE INVENTION

Exemplary embodiments of the present invention provide a backlight assembly capable of reducing volume and manufacturing cost.

Exemplary embodiments of the present invention provide a display apparatus having the backlight assembly.

According to exemplary embodiments, a backlight assembly includes; a light source including a light emitting surface through which a light exits and an optical member including a first surface disposed adjacent to the light source and a second surface disposed substantially opposite to the first surface, wherein the optical member covers the light source and guides the light therethrough.

In one exemplary embodiment, the optical member includes an incident surface to which the light is incident, the incident surface being connected with the first surface corresponding to the light source, an optical pattern disposed on the second surface and corresponding to the light source, the optical pattern reflecting a first light of the light incident through the incident surface through total internal reflection and a light guide pattern disposed on the first surface, wherein the light guide pattern directs the reflected first light to exit to an exterior of the optical member.

According to exemplary embodiments, a display apparatus includes the above-described backlight assembly and a display panel that receives the light from the backlight assembly to display an image.

According to the above, the light provided to the optical member from the light source is reflected by the optical pattern of the optical member through total internal reflection, and the reflected light exits outside the optical member by the light guide pattern of the optical member. Thus, the amount of the light exiting outside the optical member may be controlled by changing the structure of the light guide pattern, thereby providing the light having uniform brightness to the display panel. In addition, when the light source is provided in plural number, the number of the light sources may be reduced since the distance between the light sources increases.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
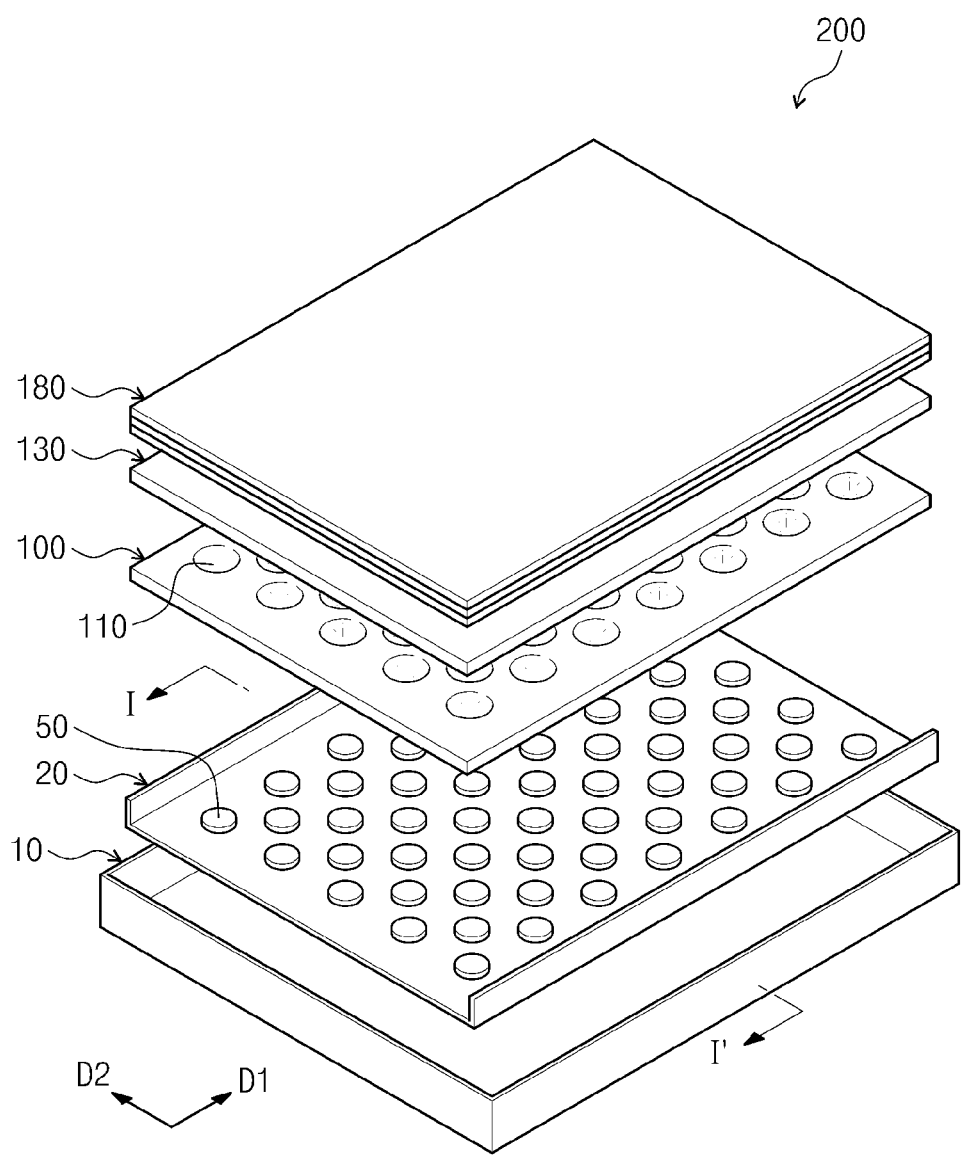
FIG. 1 is an exploded perspective view showing an exemplary embodiment of a backlight assembly according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the present invention will be explained in detail with reference to the accompanying drawings.

Figure 2A:
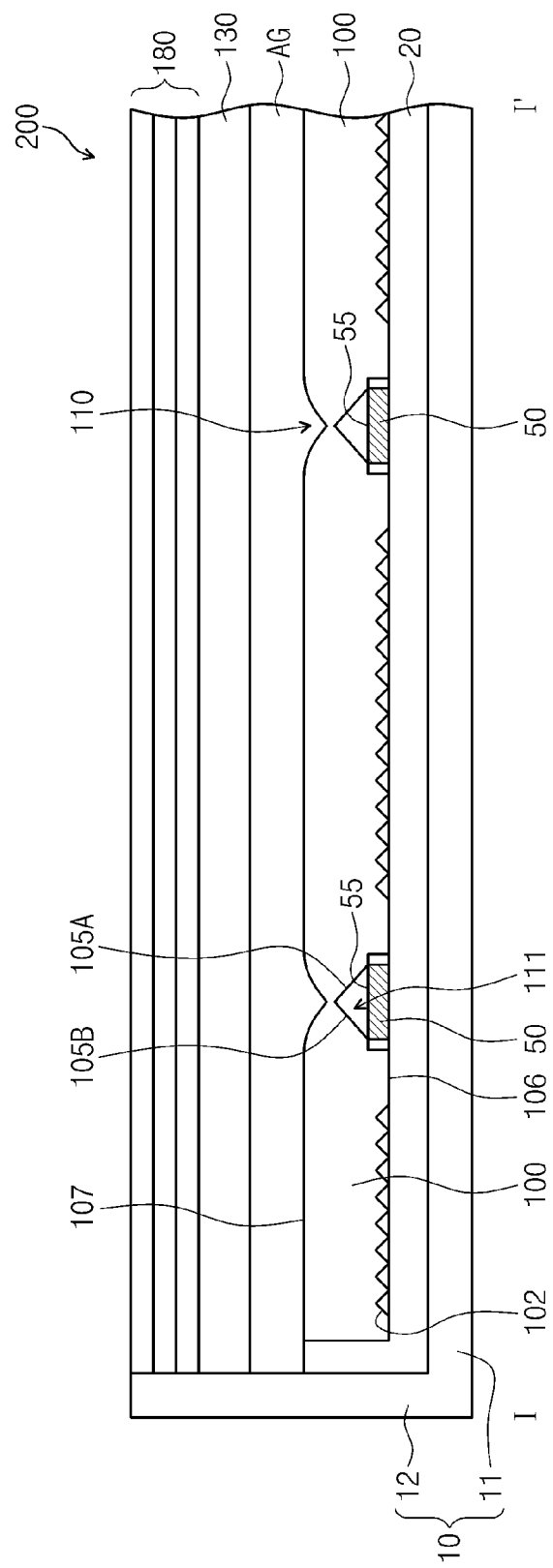
FIG. 2A is a cross-sectional view taken along line I-I' of FIG. 1.
Figure 2B:
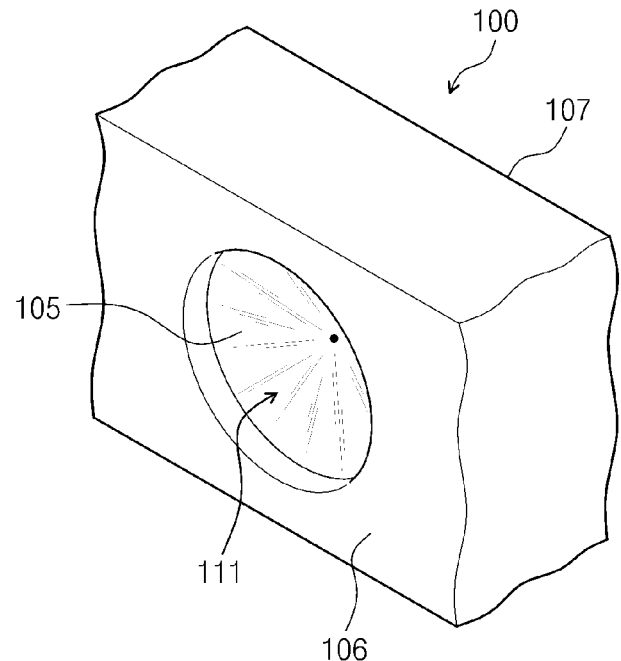
FIGS. 2B and 2C are perspective views showing exemplary embodiments of optical members according to the present invention.
Figure 2C:
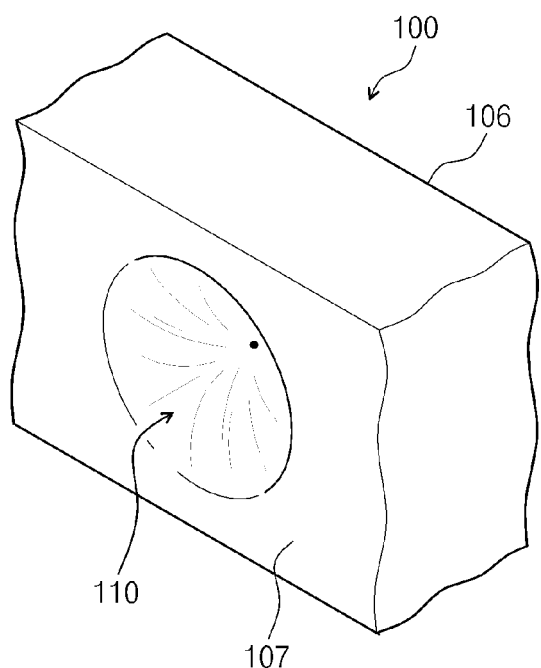

FIG. 1 is an exploded perspective view showing an exemplary embodiment of a backlight assembly according to the present invention, FIG. 2A is a cross-sectional view taken along line I-I' of FIG. 1, and FIGS. 2B and 2C are perspective views showing exemplary embodiments of optical members.

Referring to FIGS. 1 and 2A, a backlight assembly 200 includes a container 10, a reflection plate 20, a plurality of light sources 50 disposed on the reflecting plate 20, an optical member 100, a diffusion plate 130, and an optical sheet 180.

The container 10 includes a bottom part 11 and sidewalls 12 extended from the bottom part 11 to provide a containing space in which the reflection plate 20, the light sources 50, the optical member 100, the diffusion plate 130, and the optical sheet 180 are contained.

The reflection plate 20 is disposed on the bottom part 11. The reflection plate 20 may include a light reflecting material such as polyethylene terephthalate, aluminum, or other materials with similar characteristics. Accordingly, the reflection plate 20 reflects a light generated from the light sources 50 which travels to the bottom part 11, and the light reflected by the reflection plate 20 is reflected towards the optical member 100.

The light sources 50 emit the light and the light is output through a light emitting surface of each light source 50. In addition, the light sources 50 are uniformly arranged in a first direction D1 and a second direction D2 substantially perpendicular to the first direction D1 in order to have a substantially uniform number density across the reflection plate 20. In the present exemplary embodiment shown in FIGS. 1 and 2A, the light sources 50 may be a point light source, for example, a light emitting diode, an organic light emitting diode, and various other similar devices.

The optical member 100 may include a material having a refractive index of about 1.2 to about 1.8, such as polycarbonate, polymethyl methacrylate, or other materials with similar characteristics. The optical member 100 is disposed on the reflection plate 20 to cover the light sources 50 and guides the light provided from the light sources 50 to the diffusion plate 130.

The optical member 100 includes a receiving recess 111, a first optical pattern 110, and a light guide pattern 102. Hereinafter, the receiving recess 111 and the first optical pattern 110 will be described in detail with reference to FIGS. 2B and 2C.

FIG. 2B shows a first surface 106 of the optical member 100 and FIG. 2C shows a second surface 107 of the optical member 100.

Referring to FIGS. 2A, 2B, and 2C, the optical member 100 includes the first surface 106 adjacent to the reflection plate 20 and the second surface 107 opposite to the first surface 106, and the receiving recess 111 is formed in the first surface 106, e.g., by removing a portion of the first surface 106 corresponding to the light sources 50.

Since one of the light sources 50 is received in the receiving recess 111, the light emitted from the one light source is incident into the optical member 100 through an inner surface of the optical member 100, which is connected with the first surface 106. Accordingly, the inner surface of the optical member 100 includes a first incident surface 105A and a second incident surface 105B.

As shown in FIG. 2B, the inner surface that defines the receiving recess 111 may be formed by removing the first surface 106 to form a circular cone shape, and thus the first incident surface 105A may be connected with the second incident surface 105B. However, for the convenience of the explanation, the first incident surface 105A and the second incident surface 105B will be referred to as having an inclined shape with respect to a center of an emitting surface 55 as shown in FIG. 2A.

The first optical pattern 110 reflects the light incident through the first and second incident surfaces 105A and 105B and provided to the first optical pattern 110 via total internal reflection. The first optical pattern 110 will be described in detail with reference to FIGS. 3 and 4.

The light guide pattern 102 is formed on the first surface 106 and is positioned adjacent to the light sources 50, e.g., between two adjacent light sources. The light guide pattern 102 changes the path of the light reflected from the optical member 100 via total internal reflection such that the light reflected via total internal reflection exits from the optical member 100.

The diffusion plate 130 is disposed on the optical member 100. The diffusion plate 130 diffuses the light exiting from the optical member 100. In the present exemplary embodiment shown in FIGS. 1 and 2A, the diffusion plate 130 may be spaced apart from the optical member 100 while interposing an air gap portion AG therebetween. Alternative exemplary embodiments include configurations wherein the air gap portion AG is omitted.

The optical sheet 180 is disposed on the diffusion plate 130. The optical sheet 180 may include a prism sheet that condenses the light passing through the diffusion plate 130 to improve a front brightness, a diffusion sheet that diffuses the light passing through the diffusion plate, and a reflective polarization sheet that selectively transmits the light passing through the diffusion plate 130 according to a vibration direction of the light. Alternative exemplary embodiments include configurations wherein the optical sheet 180 includes multiple optical sheets and configurations wherein the optical sheet 180 is omitted.

Figure 3:
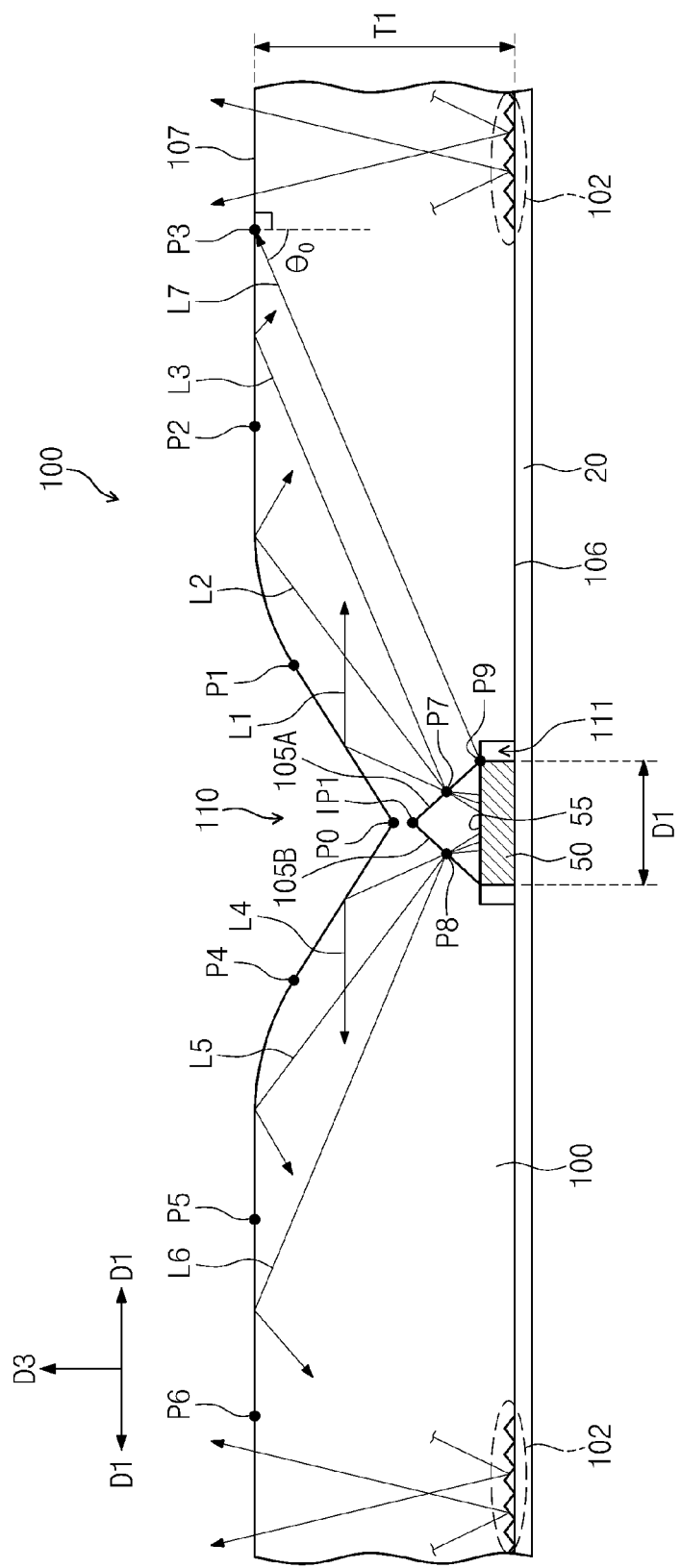
FIG. 3 is a cross-sectional view showing a principle of guiding a light by an exemplary embodiment of an optical member of FIG. 2A.

FIG. 3 is a cross-sectional view showing a principle of guiding a light by an optical member 100 of FIG. 2A. Meanwhile, a plurality of the receiving recesses 111 is provided and a plurality of the first optical patterns 102 is provided in the optical member 100 to respectively correspond to the plurality of light sources 50, but the receiving recesses 111 have the same structure and function and the first optical patterns 102 have the same structure and function. Thus, one receiving recess 111 and one first optical pattern 110 will be described in FIG. 3 and detailed descriptions of the remaining receiving recesses 111 and optical patterns 102 will be omitted. In addition, one light source 50 of the plurality of light sources 50 arranged on the reflection plate 20 will be described as a representative example.

Referring to FIG. 3, the optical member 100 includes the receiving recess 111 and the first optical pattern 110. The light source 50 is received in the receiving recess 111 and the first optical pattern 110 is positioned at a position corresponding to the receiving recess 111 and the light source 50.

The light source 50 received in the receiving recess 111 emits the light and includes the light emitting surface 55 facing the first optical pattern 110. In the present exemplary embodiment, the receiving recess 111 is formed by removing a portion of the first surface 106 into a concave shape, and the inner surface of the optical member 100 includes the first incident surface 105A and the second incident surface 105B. In addition, the first incident surface 105A meets the second incident surface 105B at a first cross point IP1, e.g., the apex of the cone formed by the receiving recess 111, and the first and second incident surfaces 105A and 105B are inclined with respect to the light emitting surface 55. Alternative exemplary embodiments include configurations wherein the receiving recess 111 is formed by alternative methods, e.g., by casting the optical member 100 to include the receiving recess 111.

As described with reference to FIG. 1, the optical member 100 has the refractive index of about 1.2 to about 1.8, and a space not filled with the light source 50 may be referred to as an air layer having a refractive index of about 1.0. Accordingly, the light exiting from the light emitting surface 55 and incident into the optical member 100 through the first and second incident surfaces 105A and 105B travels in a direction defined by a vector including first and second directions D1 and D3 as components thereof due to the inclined shape of the first and second incident surfaces 105A and 105B and the difference between the refractive index of the air layer and the refractive index of the optical member 100.

As seen from a cross-sectional perspective, the first optical pattern 110 includes a first straight line defined from a center point P0 to a first point P1, a first curved line defined from the first point P1 to a second point P2, a second straight line defined from the second point P2 to a third point P3, a third straight line defined from the center point P0 to a fourth point P4, a second curved line defined from the fourth point P4 to a fifth point P5, and a fourth straight line defined from the fifth point P5 to a sixth point P6.

The light incident through the first incident surface 105A is reflected in the optical member 100 via total internal reflection by the first straight line from P0 to P1, the first curved line from P1 to P2, and the third straight line from P2 to P3. Similarly, the light incident through the second incident surface 105B is reflected inside the optical member 100 via total internal reflection by the third straight line from P0 to P4, the second curved line from P4 to P5, and the fourth straight line from P5 to P6.

For instance, when assuming that first, second, and third lights L1, L2, and L3 are incident into the optical member 100 through a seventh point P7 on the first incident surface 105A, the first light L1 is totally internally reflected by the first straight line of the first optical pattern 110, the second light L2 is totally internally reflected by the first curved line of the first optical pattern 110, and the third light L3 is totally internally reflected by the second straight line of the optical pattern 110. Similarly, when assuming that fourth, fifth, and sixth lights L4, L5, and L6 are incident into the optical member 100 through an eighth point P8 on the second incident surface 105B, the fourth light L4 is totally internally reflected by the third straight line of the first optical pattern 110, the fifth light L5 is totally internally reflected by the second curved line of the first optical pattern 110, and the sixth light L6 is totally internally reflected by the fourth straight line of the optical pattern 110.

As described above, in order for the light incident into the optical member 100 through the seventh point P7 to be totally internally reflected by the optical pattern 110, a specific critical angle $\theta_0$ is required between the light and the optical pattern 110. In detail, when assuming that a point defined on the first incident surface 105A nearest to the light emitting surface 55 is referred to as a ninth point P9, lights incident into the optical member 100 through the ninth point P9 spread in a radial manner with reference to the ninth point P9. In this case, when the light that is most spread out among the lights passing through the ninth point P9 is defined as a seventh light L7, an angle $\theta_0$ between the seventh light L7 and the normal line of the second surface 107 may be the specific critical angle $\theta_0$ to cause the total internal reflection of the lights in the optical member 100.

Accordingly, since an angle between the normal line and the lights incident into the optical member 100 through the ninth point P9 is greater than the angle $\theta_0$, the lights incident into the optical member 100 through the ninth point P9 may be totally internally reflected by the optical pattern 110, and thus the lights incident into the optical member 100 through not only the ninth point P9 but also the entire first incident surface 105A may be totally internally reflected by the optical pattern 110.

In addition, since the optical pattern 110 has a generally symmetrical concave shape with respect to an axis vertically passing through the light source 50, the lights incident into the optical member 100 through the second incident surface 105B may be totally internally reflected by the optical pattern 110.

Meanwhile, the optical member 100 includes the light guide pattern 102 formed on the first surface 106. In the present exemplary embodiment shown in FIG. 3, the light guide pattern 102 is formed by successively removing the first surface 106 such that surfaces of the light guide pattern 102 are inclined with respect to the first surface 106. The light guide pattern 102 changes the path of the light which is totally internally reflected inside the optical member 100, so the lights may exit from the optical member 100. Alternative exemplary embodiments include configurations wherein the light guide pattern 102 may be formed by alternative methods, such as casting the optical member 100 to include the light guide pattern 102.

As shown in FIG. 3, in the present exemplary embodiment, the light guide pattern 102 is not overlapped with the first optical pattern 110 as seen from a top plan view, but the present invention is not limited thereto. That is, the light guide pattern 102 may be adjacent to the receiving recess 111 such that it is overlapped with the first optical pattern 110.

Figure 4:
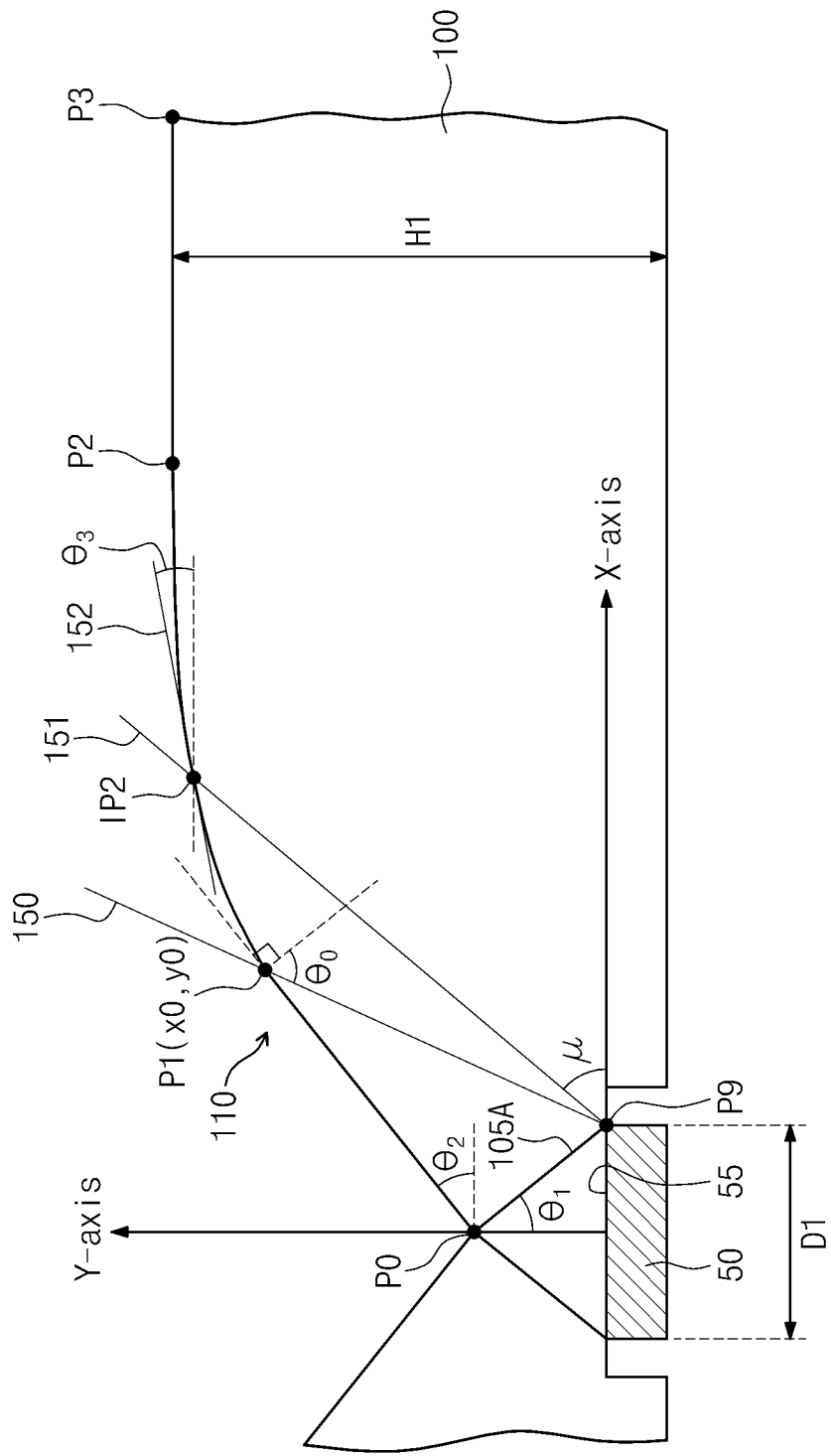
FIG. 4 is an enlarged cross-sectional view showing a structure of a first optical pattern of FIG. 3.

FIG. 4 is a cross-sectional view showing a structure of a first optical pattern 110 of FIG. 3 in detail. As described above with reference to FIG. 3, the first optical pattern 110 includes the first straight line, the first curved line, and the third straight line at the right side of the light source 50 and includes the third straight line, the second curved line, and the fourth straight line at the left side of the light source 50, and the line including the first straight line, the first curved line, and the third straight line are symmetrical with the line including the third straight line, the second curved line, and the fourth straight line with reference to the center point P0. Thus, the detailed description of the line including the third straight line, the second curved line, and the fourth straight line will be omitted. While the present detailed description is directed towards a cross-sectional view, one of ordinary skill in the art would appreciate that, as shown in FIGS. 2B and 2C, the first optical pattern 110 and the receiving recess 111 actually have substantially conical shapes.

In addition, since a distance between the center point P0 of the first optical pattern 110 and the first cross point IP1 of the receiving recess 111 is relatively small and relatively insignificant for understanding of the apparatus, the distance between the center point P0 and the first cross point IP1 has been omitted in FIG. 4.

Referring to FIG. 4, in order to define the first straight line connecting the center point P0 and the first point P1, the first curved line connecting the first point P1 and the second point P2, and the second straight line connecting the second point P2 and the third point P3 as an equation, a direction substantially parallel to the light emitting surface 55 is referred to as x-axis and a normal line of the light emitting surface 55 is referred to as y-axis. In addition, an angle between the normal line of the light emitting surface 55 and the first incident surface 105A is referred to as a first angle $\theta_1$ and an angle between the first straight line and the light emitting surface 55 is referred to as a second angle $\theta_2$.

When a function that defines the first straight line is referred to as f(x), the function f(x) may satisfy the following Equation 1.

$$f(x) = \tan(\theta_2) \times x + \frac{a}{2 \times \tan(\theta_1)} \qquad \langle \text{Equation 1} \rangle$$

In Equation 1, "a" denotes a diameter D1 of the light source 50.

In addition, the first angle $\theta_1$ and a second angle $\theta_2$ may be defined by the following Equation 2.

$$\theta_2 = 2 \times \theta_0 + \theta_1 - \frac{\pi}{2} \qquad \langle \text{Equation 2} \rangle$$

In Equation 2, $\theta_0$ denotes the critical angle described with reference to FIG. 3.

As shown in FIG. 2A, since the optical member 100 makes contact with the air layer having the refractive index of 1.0, Equation 3 related to the critical angle may be defined as follows based on Snell's law.

$$\sin(\theta_0) = \frac{1}{n} \qquad \langle \text{Equation 3} \rangle$$

In Equation 3, n denotes the refractive index of the optical member 100.

When a function that defines a first supplemental straight line 150 is referred to as g(x), the function g(x) may satisfy the following Equation 4.

$$g(x) = \tan(\theta_1 + \theta_0) \times \left(x - \frac{a}{2}\right) \qquad \langle \text{Equation 4} \rangle$$

Accordingly, an x-axis coordinate $x_0$ and a y-axis coordinate $y_0$ of the first point P1 may be obtained using Equations 1 to 4 as the following Equations 5 and 6.

$$x_0 = \frac{a}{2} \times \frac{\tan(\theta_1 + \theta_0) + \cot(\theta_1)}{\tan(\theta_1 + \theta_0) - \tan(\theta_2)} \qquad \langle \text{Equation 5} \rangle$$

$$y_0 = \frac{a}{2} \times \frac{\cot(\theta_1) + \tan(\theta_2)}{1 - \cot(\theta_1 - \theta_0) \times \tan(\theta_2)} \qquad \langle \text{Equation 6} \rangle$$

Meanwhile, when a function that defines the first curved line is referred to as h(x), a differential function h'(x) of a first curve of the first curved line may be shown as a third supplemental straight line 152 and a third angle $\theta_3$ that defines a gradient of the differential function h'(x) may be obtained. In addition, based on a second supplemental straight line 151 that meets the first curved line at a second cross point IP2 and is inclined at a fourth angle μ with respect to the x-axis, the function of h'(x) may satisfy the following Equation 7.

$$h'(x) = \tan(\theta_3) = \tan\left(\theta_0 + \mu - \frac{\pi}{2}\right) = -\cot(\theta_0 + \mu) \qquad \langle \text{Equation 7} \rangle$$

In addition, when a function that defines the second supplemental straight line is referred to as j(x), the function j(x) having a value corresponding to a half of the diameter of an intercept of the x-axis may satisfy the following Equation 8.

$$j(x) = \tan(\mu) \times \left(x - \frac{a}{2}\right) \qquad \langle\text{Equation 8}\rangle$$

Thus, a relational expression between the function of h(x) and the differential function of h'(x), which is induced using Equations 7 and 8, may satisfy the following Equation 9.

$$h'(x) = \frac{\tan(\theta_0) \times h(x) - \left(x - \frac{a}{2}\right)}{h(x) + \left(x - \frac{a}{2}\right) \times \tan(\theta_0)} \qquad \langle\text{Equation 9}\rangle$$

According to Equations 1 to 9, the first straight line and the first curved line may be defined as functions with respect to the x-axis and the y-axis. In addition, the second straight line may be connected to the first curved line to be substantially parallel to the x-axis.

Figure 5:
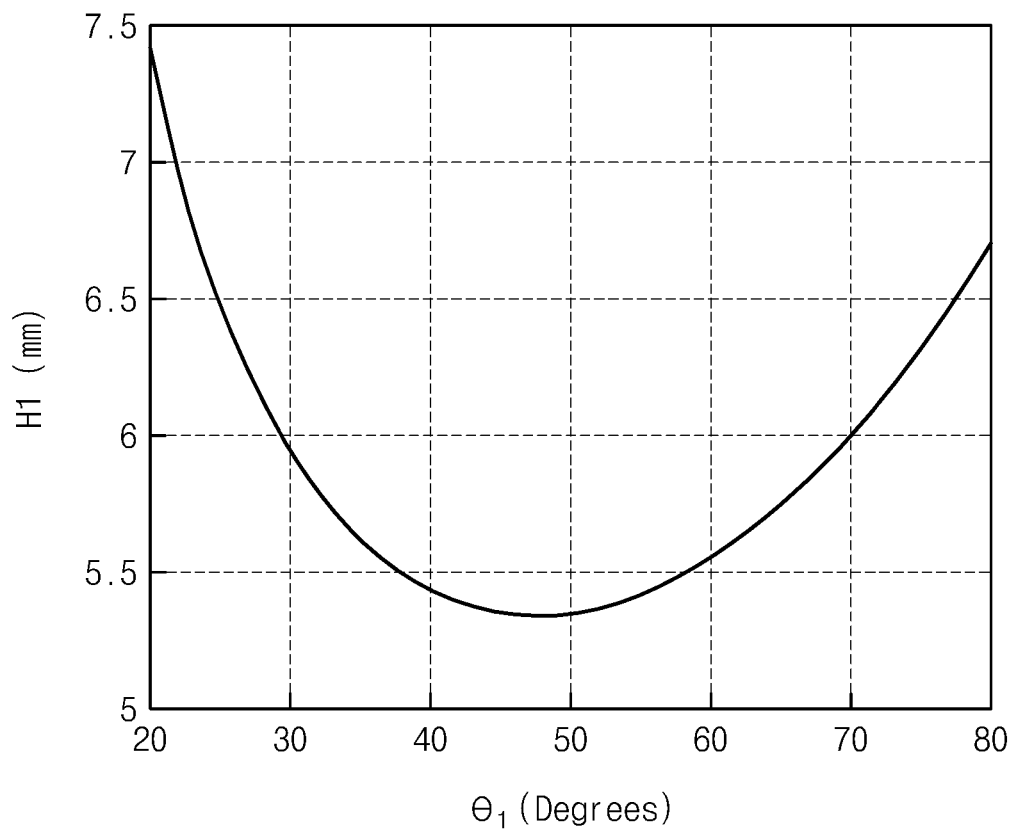
FIG. 5 is a graph showing a mutual relation between a maximum thickness of an optical member and a first angle of FIG. 4.

FIG. 5 is a graph showing a mutual relationship between a maximum thickness of an optical member 100 and a first angle of FIG. 4. In detail, FIG. 5 shows the mutual relationship between the first angle $\theta_1$ and the maximum thickness H1 when the light source 50 shown in FIG. 4 has the diameter D1 of about 4 millimeters.

Referring to FIGS. 4 and 5, the maximum thickness H1 of the optical member 100 depends upon the first angle $\theta_1$. For instance, when the first angle $\theta_1$ is about 47 degrees, the maximum thickness H1 is about 5.3 millimeters. Accordingly, in case that the optical member 100 is designed such that the first angle $\theta_1$ becomes about 47 degrees, the thickness of the optical member 100 may be minimized, thereby minimizing a volume of the backlight assembly 200.

Although not shown in FIG. 5 as a graph, the maximum thickness H1 may be adjusted according to a material used in producing the optical member 100. For example, when the optical member 100 includes polymethylmethacrylate having a refractive index of about 1.48, a value obtained by dividing the maximum thickness H1 by the diameter D1 of the light emitting surface 55 may be greater than 1.0 and smaller than 1.5.

Figure 6:
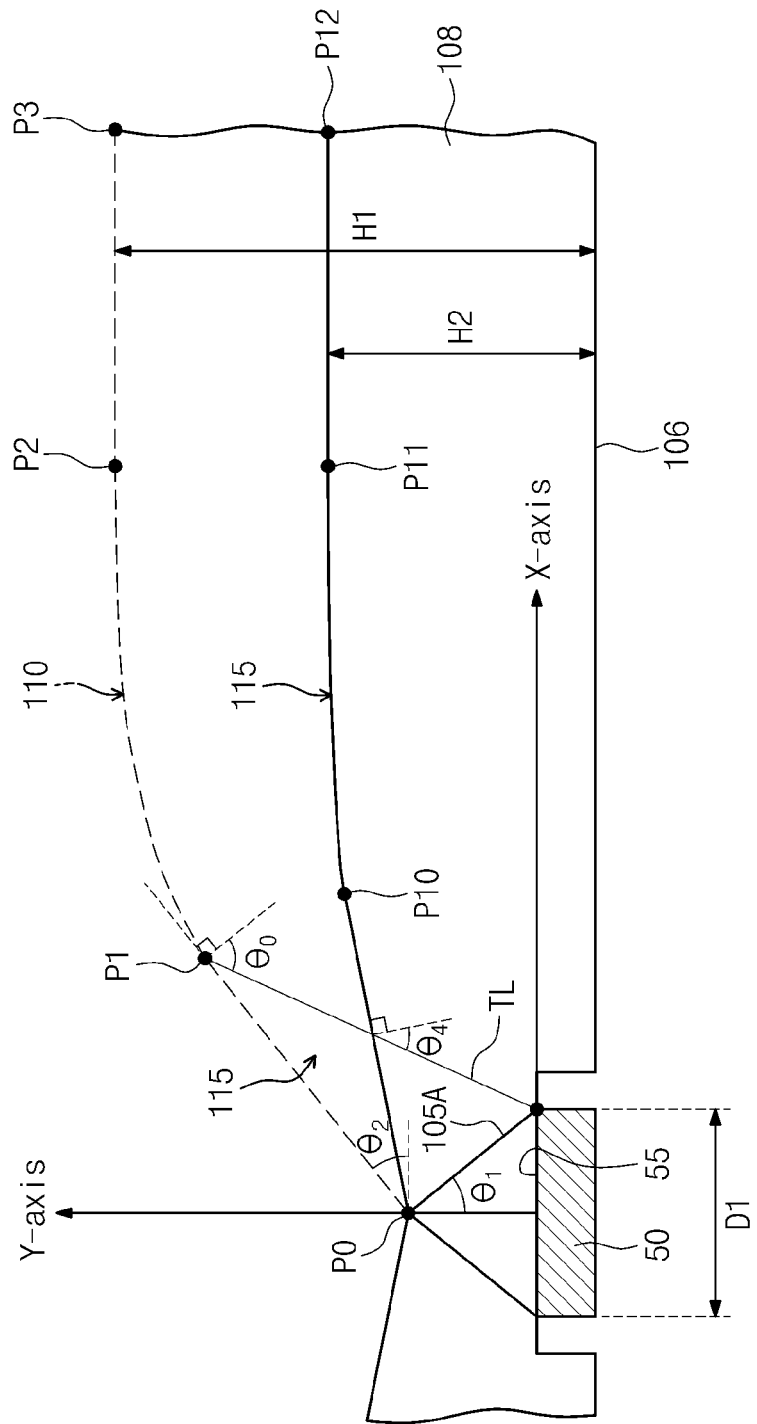
FIG. 6 is an enlarged cross-sectional view showing a second optical pattern of another exemplary embodiment of an optical member according to the present invention.

FIG. 6 is an enlarged cross-sectional view showing a second optical pattern 115 of another exemplary embodiment of an optical member 108 according to the present invention. In FIG. 6, an optical member 108 has the same structure and function as those of the optical member 100 shown in FIG. 4 except for a second optical pattern 115 of the optical member 108. Thus, the same reference numerals in FIG. 6 denote the same elements as in FIG. 4, and thus detailed descriptions of the same reference numerals will be omitted.

Referring to FIG. 6, the optical member 108 includes the second optical pattern 115. The second optical pattern 115 includes a first straight line defined from a center point P0 to a tenth point P10, a first curved line defined from the tenth point P10 to an eleventh point P11 and connected with the first straight line, and a second straight line defined from the eleventh point P11 to a twelfth point P12 and connected with the first curved line. In addition, although not shown in FIG. 6, the second optical pattern 115 has a line that is symmetrical with a line defined by the first straight line, the first curved line, and the second straight line with reference to the center point P0. Again, although the optical member 108 and the optical pattern 115 are described with respect to a cross-sectional perspective, one of ordinary skill in the art would understand that the optical pattern 115 has a three-dimensional aspect such as that of a conical shape.

In the present exemplary embodiment, the second optical pattern 115 has a shape different from the first optical pattern 110 shown in FIG. 4. Particularly, a gradient of the first straight line is smaller than a gradient of a straight line defined by the center point P0 and the first point P1 with respect to the x-axis as previously defined.

As described with reference to FIGS. 3 and 4, when an amount of the light exiting from an area in which the first optical pattern 110 is formed in the optical member 100 is referred to as a first light amount and an amount of the light exiting from an area in which the first optical pattern 110 is not formed in the optical member 100 is referred to as a second light amount, the first light amount may be smaller than the second light amount since the first optical pattern 110 shown in FIG. 3 reflects the light incident into the optical member 100 shown in FIG. 100 through total internal reflection. Thus, when the optical member 108 is designed such that the second optical pattern 115 has a different shape from the first optical pattern, a portion of the light reaching the second optical pattern 115 is reflected through total internal reflection, but a remaining portion of the light reaching the second optical pattern 115 exits to an exterior through the second optical pattern 115, which is not internally reflected by the second optical pattern 115.

More particularly, when the light incident to the first optical pattern 110 through the first incident surface 105A and reflected by the first optical pattern 110 through total reflection is defined as a total reflection light TL, an angle the total reflection light TL incident to the first optical pattern 110 serves as a critical angle $\theta_0$. In addition, when an angle of the total reflection light TL incident to the second optical pattern 115 is defined as a fourth angle $\theta_4$, the fourth angle $\theta_4$ is smaller than the critical angle $\theta_0$ since a gradient of the first straight line is smaller than a gradient of a straight line defined by the center point P0 and the first point P1. Accordingly, the total reflection light TL is reflected by the first optical pattern 110 through total internal reflection and not reflected by the second optical pattern 115 through total internal reflection, so that the totally internally reflected light may exit to the exterior through the second optical pattern 108. As a result, the first light amount may be increased as compared with that of FIGS. 3 and 4, thereby reducing the difference between the first light amount and the second light amount.

As described above, when the second optical pattern 115 is designed to have the different shape from the first optical pattern 110, the optical member 108 may have a maximum thickness H2 smaller than the maximum thickness H1 of the optical member 100 shown in FIG. 4. For instance, in an exemplary embodiment wherein the diameter D1 of the light source 50 is about four millimeters, the maximum thickness H2 may be reduced to a value of about four millimeters, the value obtained by dividing the maximum thickness H2 by the diameter D1 may be approximate to a value of 1.0.

Figure 7:
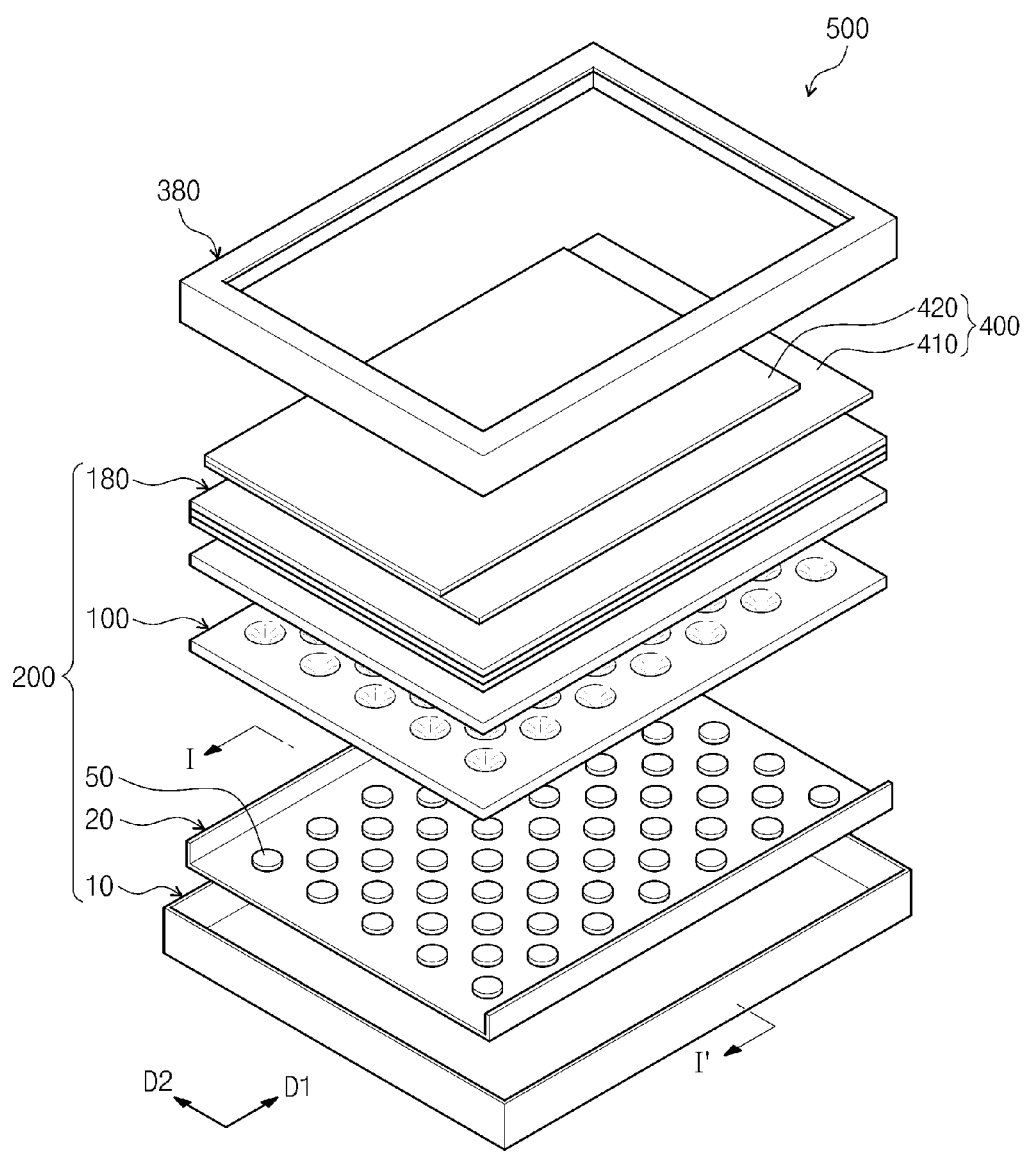
FIG. 7 is an exploded perspective view showing an exemplary embodiment of a display apparatus according to the present invention.

FIG. 7 is an exploded perspective view showing an exemplary embodiment of a display apparatus 500 according to the present invention. The display apparatus 500 includes the backlight assembly 200 of FIG. 1, a display panel 400, and a cover member 380. Thus, in FIG. 7, the same reference numerals denote the same elements as in FIGS. 1 to 5, and thus detailed description of the same elements will be omitted.

In the present exemplary embodiment, the display apparatus 500 and the display panel 400 may be a liquid crystal display ("LCD") and an LCD panel, respectively. When the display panel 400 is the LCD panel, the display panel 400 receives the light from the backlight assembly 200 to display an image.

The display panel 400 includes a first substrate 410 and a second substrate 420 facing the first substrate 410. The first substrate 410 includes a plurality of pixels (not shown) each including a thin film transistor (not shown) and a pixel electrode (not shown) electrically connected to the thin film transistor.

The second substrate 420 includes color filters (not shown) corresponding to the pixels in a one-to-one correspondence and an opposite electrode (not shown) that forms an electric field with the pixel electrode.

According to another exemplary embodiment, the color filters may be formed on the first substrate 410 rather than the second substrate 420 and in addition the common electrode may be formed on the first substrate 410 other than the second substrate 420. In an exemplary embodiment wherein the common electrode is formed on the first substrate 410, the common electrode forms a horizontal electric field with the pixel electrode. In other words, the common electrode may serve as an opposite electrode to control orientation directions of liquid crystal molecules.

The cover member 380 is coupled with the container 10 to cover an end portion of the display panel 400. As a result, the end portion of the display panel 400 is covered by the cover member 380, so that only an area in which the image is displayed may be exposed to an exterior.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a light source including a light emitting surface through which a light exits; and
an optical member including a first surface disposed adjacent to the light source and a second surface disposed substantially opposite to the first surface, wherein the optical member covers the light source and guides the light therethrough,
wherein the optical member comprises:
an incident surface to which the light is incident, the incident surface being connected with the first surface corresponding to the light source;
an optical pattern disposed on the second surface and corresponding to the light source, the optical pattern reflecting a first light of the light incident through the incident surface through total internal reflection; and
a light guide pattern disposed on the first surface, wherein the light guide pattern directs the reflected first light to exit to an exterior of the optical member,
wherein the incident surface is inclined toward a center of the light emitting surface as viewed from a cross-sectional perspective and the light incident to the optical member through the incident surface travels to the optical pattern.

2. The backlight assembly of claim 1, wherein the optical member is provided with a receiving recess formed at the first surface to correspond to the light source,
wherein the light source is received in the receiving recess, and
wherein a surface which defines the receiving recess is connected with the incident surface as viewed from a cross-sectional perspective.

3. The backlight assembly of claim 1, wherein the optical pattern has a concave shape symmetrical with respect to a line passing through a center of the light source and normal to the light emitting surface.

4. The backlight assembly of claim 3, wherein as viewed from a cross-sectional perspective the optical pattern comprises a first straight line connecting a first point and a center point disposed at a location where the optical member meets a normal line of the light emitting surface, and when an angle defined by the incident surface and the normal line of the light emitting surface is defined as a first angle, a critical angle of the light is defined such that the light incident to the optical member through the incident surface is reflected through total internal reflection, an axis parallel to the light emitting surface is defined as an x-axis, an axis parallel to the normal line is defined as a y-axis, and a function that defines the first straight line with respect to the x-axis and the y-axis is defined as f(x), the function f(x) is defined by Equations 1 and 2 as follows:

$$f(x) = \tan(\theta_2) \times x + \frac{a}{2 \times \tan(\theta_1)} \qquad \langle \text{Equation 1} \rangle$$

$$\theta_2 = 2 \times \theta_0 + \theta_1 - \frac{\pi}{2} \qquad \langle \text{Equation 2} \rangle$$

wherein a denotes a diameter of the light emitting surface, $\theta_0$ denotes the critical angle, $\theta_1$ denotes the first angle, and $\theta_2$ denotes a gradient of the first straight line.

5. The backlight assembly of claim 4, wherein the optical pattern comprises:
a first curved line which connects the first point to a second point and wherein the first curved line is connected to the first straight line; and
a second straight line which connects the second point and a third point and wherein the second straight line is connected to the first curved line, the second straight line being substantially parallel to the x-axis, and wherein a straight line having a value corresponding to a half of the diameter of the light source as an intercept of the x-axis meeting the second curve line is defined as a function of j(x), a function defining the first curved line with respect to the x-axis and the y-axis is defined as h(x), a gradient function at an intersection point where the function of j(x) meets the function of h(x) is defined as h'(x), and an angle defining a gradient of the function of h'(x) is defined as a third angle, the function j(x) and the function h'(x) are defined by Equations 3 and 4 as follows:

$$j(x) = \tan(\mu) \times \left(x - \frac{a}{2}\right) \qquad \langle \text{Equation 3} \rangle$$

$$h'(x) = \tan(\theta_3) = \tan\left(\theta_0 + \mu - \frac{\pi}{2}\right) = -\cot(\theta_0 + \mu) \qquad \langle \text{Equation 4} \rangle$$

wherein μ denotes an angle defining the gradient of the j(x), and $\theta_3$ denotes an angle defining the gradient of the h'(x), and wherein the function h(x) and the function h'(x) satisfy Equation 5 as follows:

$$h'(x) = \frac{\tan(\theta_0) \times h(x) - \left(x - \frac{a}{2}\right)}{h(x) + \left(x - \frac{a}{2}\right) \times \tan(\theta_0)}. \quad \langle\text{Equation 5}\rangle$$

6. The backlight assembly of claim 3, wherein a second light of the light incident to the optical member through the incident surface exits to an exterior through the optical pattern.

7. The backlight assembly of claim 6, wherein, when an angle defined by the incident surface and a normal line of the light emitting surface is defined as a first angle, a critical angle of the light is defined such that a light incident to the optical member through the incident surface is reflected through total internal reflection, an axis parallel to the light emitting surface is defined as an x-axis, an axis parallel to the normal line is defined as a y-axis, the optical pattern comprises:
   a first straight line which connects a first point and a center point disposed at a location where the optical member meets a normal line of the light emitting surface;
   a first curved line which connects the first point to a second point, wherein the first curved line is connected to the first straight line; and
   a second straight line which connects the second point and a third point, wherein the second straight line is connected to the first curved line, and when a function defining the first straight line with respect to the x-axis and the y-axis is defined as f(x), the f(x) is defined by Equations 6 and 7 as follows:

$$f(x) = \tan(\theta_2) \times x + \frac{a}{2 \times \tan(\theta_1)} \quad \langle\text{Equation 6}\rangle$$

$$\theta_2 < 2 \times \theta_0 + \theta_1 - \frac{\pi}{2} \quad \langle\text{Equation 7}\rangle$$

wherein a denotes a diameter of the light emitting surface, $\theta_0$ denotes the critical angle, $\theta_1$ denotes the first angle, and $\theta_2$ denotes a gradient of the first straight line.

8. The backlight assembly of claim 1, wherein the light source is provided in plural numbers, the light sources are arranged in a first direction and a second direction substantially perpendicular to the first direction while being spaced apart from each other, and the optical member covers and is aligned with the light sources.

9. The backlight assembly of claim 1, wherein the first light is initially reflected by the optical pattern through total internal reflection inside the optical member.

10. The backlight assembly of claim 1, wherein the optical member has a refractive index greater than that of air, and a value obtained by dividing a maximum thickness of the optical member by a diameter of the light source is greater than about 1.0 and smaller than about 1.5.

11. A display apparatus comprising:
   a backlight assembly which generates a light; and
   a display panel which receives the light to display an image,
   wherein the backlight assembly comprises:
   a light source including a light emitting surface through which a light exits; and
   an optical member including a first surface adjacent to the light source and a second surface substantially opposite to the first surface, the optical member covering the light source and guiding the light, and wherein the optical member comprises:
   an incident surface to which the light is incident, the incident surface being connected with the first surface corresponding to the light source;
   an optical pattern disposed on the second surface and corresponding to the light source, the optical pattern reflecting a first light of the light incident through the incident surface through total internal reflection; and
   a light guide pattern disposed on the first surface, wherein the light guide pattern directs the reflected first light to exit to an exterior of the optical member,
   wherein the incident surface is inclined toward a center of the light emitting surface as viewed from a cross-sectional perspective and the light incident to the optical member through the incident surface travels to the optical pattern.

12. The display apparatus of claim 11, wherein the optical member is provided with a receiving recess positioned at the first surface to correspond to the light source, the light source is received in the receiving recess, and a surface that defines the receiving recess is connected with the incident surface as viewed from a cross-sectional perspective.

13. The display apparatus of claim 11, wherein the optical pattern has a concave shape substantially symmetrical with respect to a line passing through a center of the light source and normal to the light emitting surface.

14. The display apparatus of claim 13, wherein the optical pattern comprises a first straight line which connects a first point and a center point disposed at a location where the optical member meets a normal line of the light emitting surface, and when an angle defined by the incident surface and the normal line of the light emitting surface is defined as a first angle, a critical angle of the light is defined such that the light incident to the optical member through the incident surface is reflected through total internal reflection, an axis parallel to the light emitting surface is defined as an x-axis, an axis parallel to the normal line is defined as a y-axis, and a function that defines the first straight line with respect to the x-axis and the y-axis is defined as f(x), the function f(x) is defined by Equations 1 and 2 as follows:

$$f(x) = \tan(\theta_2) \times x + \frac{a}{2 \times \tan(\theta_1)} \quad \langle\text{Equation 1}\rangle$$

$$\theta_2 = 2 \times \theta_0 + \theta_1 - \frac{\pi}{2} \quad \langle\text{Equation 2}\rangle$$

where a denotes a diameter of the light emitting surface, $\theta_0$ denotes the critical angle, $\theta_1$ denotes the first angle, and $\theta_2$ denotes a gradient of the first straight line.

15. The display apparatus of claim 14, wherein the optical pattern comprises:
   a first curved line connecting the first point to a second point, wherein the first curved line connects to the first straight line; and
   a second straight line which connects the second point and a third point and wherein the second straight line connects to the first curved line, the second straight line is substantially parallel to the x-axis, and wherein a straight line having a value corresponding to a half of the diameter as an intercept of the x-axis meeting the second curved line is defined as a function of j(x), a function defining the first curved line with respect to the x-axis and the y-axis is defined as h(x), a gradient function at an intersection point where the function of j(x) meets the function of h(x) is defined as h'(x), and an angle defining a gradient of the function of h'(x) is defined as a third angle, the function j(x) and the function h'(x) are defined by Equations 3 and 4 as follows:

$$j(x) = \tan(\mu) \times \left(x - \frac{a}{2}\right) \quad \langle\text{Equation 3}\rangle$$

$$h'(x) = \tan(\theta_3) = \tan\left(\theta_0 + \mu - \frac{\pi}{2}\right) = -\cot(\theta_0 + \mu) \quad \langle\text{Equation 4}\rangle$$

wherein μ denotes an angle defining the gradient of the j(x), and $\theta_3$ denotes an angle defining the gradient of the h'(x), and wherein the function h(x) and the function h'(x) satisfy following Equation 5:

$$h'(x) = \frac{\tan(\theta_0) \times h(x) - \left(x - \frac{a}{2}\right)}{h(x) + \left(x - \frac{a}{2}\right) \times \tan(\theta_0)}. \quad \langle\text{Equation 5}\rangle$$

16. The display apparatus of claim 13, wherein a second light of the light incident to the optical member through the incident surface exits to an exterior through the optical pattern.

17. The display apparatus of claim 16, wherein, when an angle defined by the incident surface and the normal line of the light emitting surface is defined as a first angle, a critical angle of the light is defined such that the light incident to the optical member through the incident surface is reflected through total internal reflection, an axis parallel to the light emitting surface is defined as an x-axis, an axis parallel to the normal line is defined as a y-axis, the optical pattern comprises:

a first straight line which connects a first point and a center point disposed at a location where the optical member meets a normal line of the light emitting surface;

a first curved line which connects the first point to a second point, wherein the first curved line is connected to the first straight line; and a second straight line connecting the second point and a third point, wherein the second straight line is connected to the first curve line, wherein a function defining the first straight line with respect to the x-axis and the y-axis is defined as f(x), the function f(x) is defined by Equations 6 and 7 as follows:

$$f(x) = \tan(\theta_2) \times x + \frac{a}{2 \times \tan(\theta_1)} \quad \langle\text{Equation 6}\rangle$$

$$\theta_2 < 2 \times \theta_0 + \theta_1 - \frac{\pi}{2} \quad \langle\text{Equation 7}\rangle$$

where a denotes a diameter of the light emitting surface, $\theta_0$ denotes the critical angle, $\theta_1$ denotes the first angle, and $\theta_2$ denotes a gradient of the first straight line.

18. The display apparatus of claim 17, wherein the optical member has a refractive index greater than that of air, and a value obtained by dividing a maximum thickness of the optical member by a diameter of the light source is greater than about 1.0 and smaller than about 1.5.

* * * * *